United States Patent [19]

Webb et al.

[11] 4,174,957

[45] Nov. 20, 1979

[54] SYNTHETIC GROWING MEDIUM AND METHOD OF PREPARING IT

[75] Inventors: Jack Webb, Madison, Ohio; Stanley L. Schwartz, Sands Point, N.Y.

[73] Assignee: Hydrosoil Corporation, New York, N.Y.

[21] Appl. No.: 883,613

[22] Filed: Mar. 6, 1978

[51] Int. Cl.$^2$ ............................ C05C 9/02; C05G 3/04
[52] U.S. Cl. ..................................... 71/24; 71/64 SC; 47/DIG. 7
[58] Field of Search .................. 47/DIG. 7, 71, 74; 71/28, 29, 24, 64 G, 64 D, 64 SC

[56] References Cited

U.S. PATENT DOCUMENTS

| | | | |
|---|---|---|---|
| 3,336,129 | 8/1967 | Herrett et al. | 47/DIG. 7 |
| 3,373,009 | 3/1968 | Pruitt et al. | 71/28 |
| 3,573,892 | 4/1971 | Atkins et al. | 71/64 G X |
| 3,899,850 | 8/1975 | Gluck et al. | 47/74 |
| 3,961,445 | 6/1976 | Rack | 47/74 |
| 4,025,329 | 5/1977 | Goertz | 71/28 X |

FOREIGN PATENT DOCUMENTS

| | | | |
|---|---|---|---|
| 2307732 | 8/1974 | Fed. Rep. of Germany | 47/DIG. 7 |
| 2548851 | 5/1976 | Fed. Rep. of Germany | 71/24 |
| 1420522 | 1/1976 | United Kingdom | 71/24 |

*Primary Examiner*—Kenneth M. Schor
*Attorney, Agent, or Firm*—Alan H. Levine

[57] ABSTRACT

A synthetic growing medium comprising a thorough mixture of urea formaldehyde foam granules, powdered humus, and a wetting agent. The medium also includes plant nutrients, trace elements, and pH adjusting material. The growing medium is prepared by grinding urea formaldehyde foam into granules having an average diameter of between 0.1 and 1.0 centimeter. Separately, humus, such as peat, is ground to a powder. A liquid wetting agent is sprayed onto the humus and thereafter the wetting agent-carrying humus powder is mixed with the foam granules. The proportion of foam to humus is within the range of 250 parts foam to one part humus to one part foam to five parts humus. At any appropriate time, nutrients, trace elements, and pH adjusting materials are added to the mixture.

8 Claims, No Drawings

SYNTHETIC GROWING MEDIUM AND METHOD OF PREPARING IT

This invention relates to a synthetic growing medium as a replacement for, or amendment to, soil and other natural materials in the growing of horticultural and agricultural products.

The synthetic growing medium employs a plastic foam, the basic constituents of which are urea and formaldehyde; the unique characteristic of this plastic foam is that when it "sets up," i.e., is formed into a solid foam product through the use of appropriate and known catalysts and foaming agents, it becomes a mass of hollow cells. It is this internal hollow-cell structure and the resultant ability to hold unusual proportions of liquids, that make the foam uniquely advantageous as a component of a growing medium.

During the approximately twenty years since the initial invention of urea formaldehyde foam, and its introductory use as a means of sealing deep level coal mines in Germany against methane gas leaks, a number of attempts have been made to utilize the hollow-cell structure of the material for agricultural applications. Two such applications have been succcessful. One involves the use of the foam in a solid block form as a holder for cut flowers and as a rooting block for starting plants from seeds or cuttings. The other successful application involves using the foam, very finely ground, as a carrier of a wetting agent, and then working this material into soil to increase its ability to hold moisture. All attempts to make a growing medium or a major soil amendment of the foam itself have, however, failed until the development that is the subject of this invention.

When the urea foamaldehyde foam sets up in its conventional form it is strongly hydrophobic, and resists water. In order to make the foam hydrophilic it must be treated with a wetting agent. After being rinsed or sprayed with an appropriate wetting agent the foam will absorb into its hollow-cell structure approximately one half of its total volume of water with much of the rest of its volume being air, thus making it an ideal growing medium. The problem with its practical use as a synthetic soil, or an amendment for mixture with natural soil, is that in the process of introducing the wetting agent the foam becomes soggy and extremely suseptible to compaction, which destroys its ability to hold moisture. Even without the introduction of the wetting agent, the foam, when granulated into a form suitable for agricultural or horticultural applications, has a tendency to compact even under its own minimum weight, again destroying its usefulness as a growing medium or a soil amendment.

The present invention addresses itself to the problem of introducing the wetting agent in such form that it does not destroy the practical ability to use the foam as a synthetic soil or soil amendment, while at this same time curing the natural tendency of the granulated foam to compact under its own weight. It has been found that by mixing very thoroughly the granulated foam immediately as it is ground up with peat or peat-like humus, when the peat or peat-like humus has been itself ground and reground to the consistency of fine flour or dust, the peat dust coats the exterior of the foam granules, and acts as a barrier to compaction.

Furthermore, a liquid wetting agent (that changes the characteristics of the foam from extreme hydrophobia to extreme hydrophilia) can be mist-sprayed into the peat while it was being pulverized and tumbled. The microscopic droplets of the wetting agent permeate the pulverized peat; the wetting agent retains the capacity of increasing the ability to absorb water of any substance with which the wetting agent is brought into contact, but, at the same time, becoming apparently and functionally "dry."

When the pulverized peat, permeated with the wetting agent, is mixed thoroughly with the granulated foam, the resultant material surprisingly gains an extremely high ability to retain water, while the problem of compaction is eliminated.

In preparing both the synthetic growing medium and the soil amendment, the urea formaldehyde foam is ground into irregularly shaped granules each having an average diameter of between 0.1 and 1.0 centimeter. The proportions of foam granules to peat or humus dust may vary, depending upon the ultimate use to which the material will be put, from one part humus to 250 parts foam to one part foam to five parts humus, all proportions being by volume. When preparing a soil amendment, much more foam is used than humus, e.g., 250:1. When preparing a synthetic growing medium for plants which require only a little moisture, more humus is used than foam, e.g., 5:1. A mixture which works well as a synthetic growing medium for many types of plants includes two parts foam to one part humus.

Many standard surfactants may be used as a wetting agent and sprayed on to the peat. For example, alcohol or various phosphates such as those used in detergents are useful. It has been found that a wetting agent sold under the trademark Surfside 30 by Robert Oechsle of Ambler, Pa. is particularly suitable.

So as to maximize plant growth, it is desirable to introduce into the mix certain nutrients and other desirable elements, depending upon what plants are to be grown in the medium. Nutrients which may be added are calcium nitrate and certain phosphates. Trace elements, such as boron, copper, zinc, and iron may also be added. In addition, the pH of the mix should be adjusted, so as to conform to the needs of the specific plants and the growing methods of the user. To raise the pH of the mixture, agricultural grade lime is added. To lower the pH, agricultural grade sulfur is added.

It has been found that the most appropriate and, most easily controlled method of introducing into the mix the necessary nutrients, minerals, and trace elements, and the pH-adjusting materials, is to add these in desired amounts to the peat or humus while the latter is being pulverized and permeated with the wetting agent. By then mixing thoroughly this prepared substance with a selected volume of granulated foam, optimum growing mixtures can be produced for a wide variety of plants.

EXAMPLE

Urea formaldehyde foam was prepared in the usual way by introducing urea formaldehyde resin, freon as a foaming agent, and air into a mixing chamber through a three-chamber mixing gun. The resultant product was a flexible foam. If desired, such foam can be purchased in block form, such as from suppliers of insulation to the construction industry.

The foam was ground, in a Hammermill grinder of the type used by animal feed producers, into granules having an average diameter between 0.1 and 1.0 centimeter. In a separate operation, peat was pulverized into a powdery or dust-like consistency using a Hammermill grinder. During the pulverizing, WEX liquid wetting agent was aerosol sprayed on to the peat. Also during the pulverizing, nutrients sold under the trademark Ozmacote 14-14-14 by Sierra Chem. Co. of Milpitas, Cal. and trace elements sold under the trademark Peter's Fritted Trace Elements by Peters Fertilizer, Allentown, Pa. were introduced into the grinder. At the same time, lime was added to raise the pH of the mixture.

The pulverized peat carrying the wetting agent and mixed with nutrients, trace elements, and lime was then mixed thoroughly with the foam granules using a screw conveyer until the peat dust thoroughly coated the foam granules.

In this example, the wetting agent, nutrients, trace elements, and pH adjusting material were all added to the humus while that latter was being pulverized. This is convenient, but not essential. The wetting agent could be added after pulverizing of the humus is completed, as long as the peat is tumbled during spraying of the wetting agent. The other materials can be added in separate steps and thoroughly mixed at each step. In fact, the order in which the wetting agent and other materials are added to the peat is not significant.

The growing medium according to this invention has been found to hold as much as about three and one-half times its own weight of water. This may be compared to horticultural grade vermiculite which holds about two-thirds its own weight of water.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A synthetic growing medium for plants comprising water-insoluble urea formaldehyde foam granules, powdered peat-like humus, and a wetting agent, the wetting agent being carried by the powdered humus particles, the powdered humus completely coating each foam granule, and the foam granules being unbonded to each other so that the entire mass of coated foam granules is loose and free flowing and can be intimately mixed with or used in placed of natural soil.

2. A synthetic growing medium as defined in claim 1 including nutrients needed by growing plants.

3. A synthetic growing medium as defined in claim 1 including trace elements needed by growing plants.

4. A synthetic growing medium as defined in claim 1 including a pH adjusting material.

5. A synthetic growing medium as defined in claim 1 wherein the average diameter of each of said foam granules falls within the range of 0.1 to 1.0 centimeter.

6. A synthetic growing medium as defined in claim 1 wherein the proportion of foam to humus falls with the range of 250 parts foam to one part humus to one part foam to five parts humus, all proportions being by volume.

7. A method of preparing a synthetic growing medium comprising the steps of providing granulated water-insoluble urea formaldehyde foam, providing peat-like humus, spraying the humus with a wetting agent and grinding the humus into a powder, and thereafter thoroughly mixing the wetting agent-carrying humus powder with the foam granules so as to completely coat each foam granule with the powdered humus and to result in a mass of unbonded loose and free flowing coated foam granules which can be intimately mixed with or used in place of natural soil.

8. A method as defined in claim 7 including the step of mixing with the foam and humus, material selected from the group comprising nutrients, trace elements, and pH adjusting material.